United States Patent
Aharoni et al.

(10) Patent No.: US 9,170,787 B2
(45) Date of Patent: Oct. 27, 2015

(54) COMPONENTIZATION OF COMPILER FUNCTIONALITY

(75) Inventors: Avner Y. Aharoni, Seattle, WA (US); Henricus Johannes Maria Meijer, Mercer Island, WA (US); Timothy Yat Tim Ng, Bellevue, WA (US); Amanda K. Silver, Seattle, WA (US); Paul A. Vick, Seattle, WA (US); Scott Daniel Wisniewski, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1325 days.

(21) Appl. No.: 12/163,772

(22) Filed: Jun. 27, 2008

(65) Prior Publication Data

US 2009/0328013 A1    Dec. 31, 2009

(51) Int. Cl.
*G06F 9/45*        (2006.01)
*G06F 9/455*       (2006.01)

(52) U.S. Cl.
CPC ...... *G06F 8/41* (2013.01); *G06F 8/443* (2013.01); *G06F 8/447* (2013.01); *G06F 9/45504* (2013.01); *G06F 9/45516* (2013.01)

(58) Field of Classification Search
USPC .................................................. 717/140–153
See application file for complete search history.

(56) References Cited

U.S. PATENT DOCUMENTS

| | | | |
|---|---|---|---|
| 5,500,881 A * | 3/1996 | Levin et al. | 717/141 |
| 5,826,087 A * | 10/1998 | Lohmann | 717/146 |
| 6,457,172 B1 * | 9/2002 | Carmichael et al. | 717/141 |
| 6,522,343 B2 * | 2/2003 | Sobeski et al. | 715/744 |
| 6,615,199 B1 | 9/2003 | Bowman-Amuah | |
| 7,218,218 B1 * | 5/2007 | Rogers | 340/522 |
| 7,219,329 B2 | 5/2007 | Meijer et al. | |
| 7,315,872 B2 | 1/2008 | Narang et al. | |
| 2002/0166113 A1 * | 11/2002 | Stoodley | 717/140 |
| 2003/0110470 A1 * | 6/2003 | Hanson et al. | 717/114 |
| 2003/0131347 A1 * | 7/2003 | Allison | 717/165 |
| 2004/0230958 A1 * | 11/2004 | Alaluf | 717/140 |
| 2004/0260691 A1 | 12/2004 | Desai et al. | |
| 2006/0026568 A1 * | 2/2006 | Wiltamuth et al. | 717/122 |
| 2006/0074792 A1 * | 4/2006 | Wagoner et al. | 705/37 |
| 2006/0123383 A1 | 6/2006 | Apte et al. | |
| 2007/0055978 A1 | 3/2007 | Meijer et al. | |
| 2007/0074171 A1 * | 3/2007 | Burka et al. | 717/127 |
| 2007/0074185 A1 * | 3/2007 | Meijer et al. | 717/140 |
| 2008/0022267 A1 * | 1/2008 | Johnson et al. | 717/143 |
| 2008/0320444 A1 * | 12/2008 | Meijer et al. | 717/110 |

OTHER PUBLICATIONS

Ogawa et al., OpenJIT Frontend System: An Implementation of the Reflective JIT Compiler Frontend, 2000, pp. 135-154.*

(Continued)

*Primary Examiner* — Lewis A Bullock, Jr.
*Assistant Examiner* — Tina Huynh
(74) *Attorney, Agent, or Firm* — Kevin Sullivan; Aaron Hoff; Micky Minhas

(57) ABSTRACT

Compiler functionality is componentized to enable use across different contexts. Conventionally tightly coupled functionality is decoupled and an interface afforded to facilitate interaction with compiler components/subcomponents in various scenarios. In one instance, compiler components can be employed across compile time and runtime. Compile time functionality can be employed at runtime and runtime functionality utilized at compile time thereby blurring the line between time dimensions.

18 Claims, 12 Drawing Sheets

(56) References Cited

OTHER PUBLICATIONS

Skinner. Use the .NET Framework to Generate and Execute Custom Controls at Run Time http://msdn.microsoft.com/en-us/magazine/cc163689.aspx?code=true. Last accessed May 1, 2008, 12 pages.

Quintino, et al. Runtime Automatic Generation of Template Static Binded Code http://www.it.uu.se/research/conf/SCSE07/material/Quintino-abstract.pdf. Last accessed May 1, 2008, 2 pages.

Dynamically Loading and Using Types http://msdn.microsoft.com/en-us/library/k3a58006(VS.71).aspx. Last accessed May 1, 2008, 10 pages.

Pobar. Create a Language Compiler for the .NET Framework http://nnsdn.microsoft.conn/en-us/nnagazine/cc136756.aspx. Last accessed May 1, 2008, 9 pages.

* cited by examiner

COMPONENTIZATION OF COMPILER FUNCTIONALITY

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

A programmer utilizing a programming language creates the instructions comprising a computer program. Typically, source code is specified or edited by a programmer manually and/or with help of an integrated development environment (IDE). By way of example, a programmer may choose to implement source code utilizing an object-oriented programming language (e.g., C#, VB, Java . . . ) where programmatic logic is specified as interactions between instances of classes or objects, among other things. Subsequently, the source code can be compiled or otherwise transformed to facilitate execution by a computer or like device.

A compiler produces code for a specific target from source code. For example, some compilers transform source code into native code for execution by a specific machine. Other compilers generate intermediate code from source code, where this intermediate code is subsequently interpreted dynamically at run time or compiled just-in-time (JIT) to facilitate cross-platform execution, for instance.

Compilers perform lexical, syntactic, and semantic analysis as well as code generation. A scanner or lexer performs lexical analysis to convert a sequence of characters into tokens based on a program language specification. A parser performs syntactic analysis of tokens provided by the lexer in an attempt to determine structure and often captures such structure in a parse tree in accordance with a formal language grammar. Subsequently, semantic analysis can be performed with respect to the parse tree to determine meaning associated with the code as well as perform type checking and binding, among other things. Finally, a code generator produces code in a target language as a function of the analysis performed.

Type checking is a process of verifying and enforcing type constraints. Programming languages employ type systems to classify data into types that define constraints on data or sets of values as well as allowable operations. This helps ensure program correctness, among other things. Accordingly, types are checked during the semantic analysis phase to ensure values and expressions are being utilized appropriately. In some instances, types are not explicit but rather need to be inferred from contextual information. Thus, type checking sometime necessitates type inference and binding of types to objects.

Knowledge of types is significant in a binding process. Binding refers to associating a value with an identifier or resolving a variable to its definition, among other things. Some programming languages allow overloading of constructs such as functions or methods. More specifically, objects of different types can include the same function or method names. It is only after an object type is determined that the correct definition is known.

However, program languages differ as to when binding occurs. Static or early-bound languages require binding to be performed at compile time. Dynamic or late-bound languages perform binding dynamically at runtime. Other languages employ a hybrid or dual approach in which they bind statically at compile time where possible and defer other binding to runtime. Here, two compilers are conventionally employed—one that operates at compile time to enable early binding and another that operates a runtime to perform late binding.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to componentization of compiler functionality. Rather than being tightly coupled, compiler phases and/or passes or portions thereof, such as code binders, generators, and optimizers, are componentized. Such compiler components can be employed and reused across time dimensions or various contexts. In one instance, static compiler functionality can be employed dynamically at runtime. Additionally or alternatively, dynamic functionality can be leveraged at compile time. The line between compile time and runtime is thus blurred.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to componentization of compiler functionality are described in detail hereinafter. Conventional compiler functionality is tightly coupled and context dependent. In accordance with the subject disclosure, such functionality can be componentized to enable reusability of compiler functionality across different scenarios including those outside original creative scope. In one particular instance, compiler components can be employed at both compile time and runtime thereby blurring the line between time dimensions. An interface is provided to facilitate interaction with compiler components across such differing contexts.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
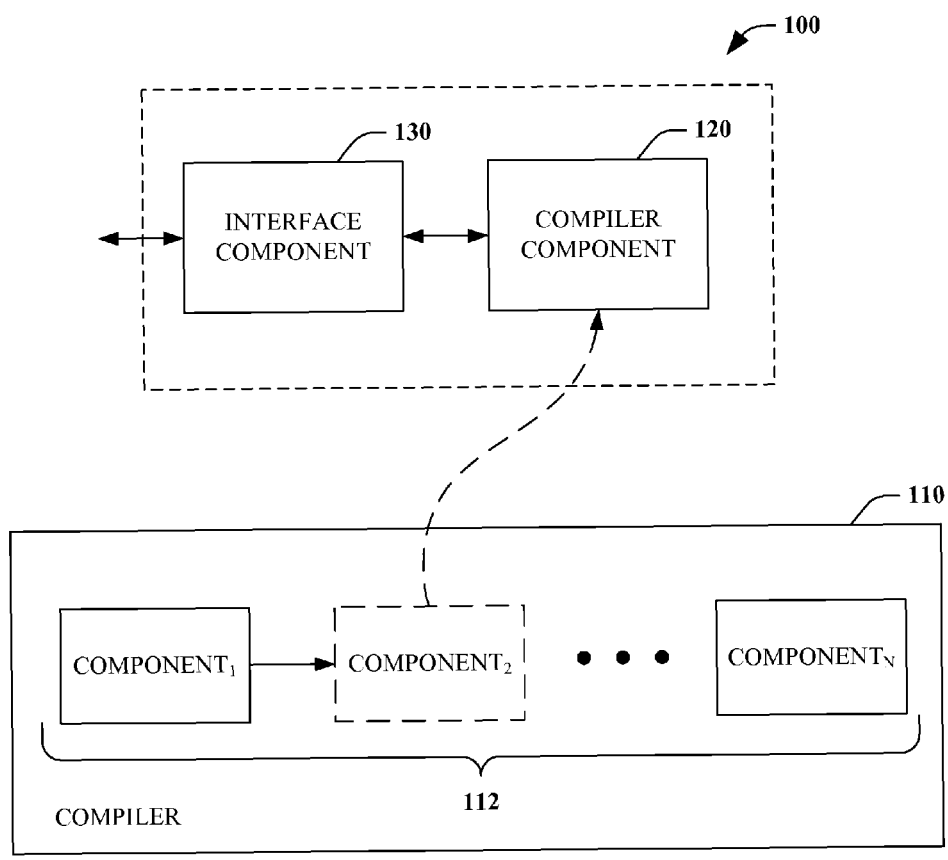
FIG. 1 is a block diagram of code compilation system in accordance with an aspect of the disclosure.

Referring initially to FIG. 1, a code compilation system 100 is illustrated in accordance with an aspect of the claimed subject matter. A conventional compiler 110 includes a number of components ($COMPONENT_1$ to $COMPONENT_N$, where N is an integer greater than one) or subcomponents 112 to perform specific functionality in furtherance of code compilation. In other words, components 112 can capture a number of compiler phases or passes. However, the compiler 112 assumes a closed world and compiler components 112, phases or the like are strongly coupled.

The compiler 110 and other conventional compilers follow a specific sequence of processing. For instance, compilation can begin by performing some parsing followed by semantic analysis, type checking and code generation. The compiler 110 assumes that all these phases or processes happen in the same order and information flow between them is well known. By way of example, a code generator assumes that all previous phases finished or at least that all required information is available. Code generation is not performed, for instance, if there is a type error. These and other assumptions dictate strong coupling of compiler components 112.

Contrary to convention, the compilation system 100 provides a modular or componentized approach to compiler functionality. In particular, compiler component 120 captures functionality afforded by a tightly coupled component 112 but in a decoupled and/or context independent manner. Interface component 130 is communicatively coupled with the compiler component 120 to enable interaction with functionality provided thereby. The interface component 130 enables communication to be acquired for the compiler component 120 and/or transmitted from the same component. As will be described further below, the interface component 130 can also perform translation, transformation, and/or mapping, among other things, to allow interactions across various contexts.

In accordance with one aspect of the disclosure, componentization of compiler functionality can be employed to enable the same component to be utilized at both compile time and runtime. Most programming languages are either static or dynamic meaning that they require either a static compiler or a dynamic compiler, interpreter or the like. However, some hybrid programming languages support both static and dynamic compilation. In this scenario, two compilers are present to handle compilation in different time dimensions. While differences exist with respect to representations at compile time and runtime, core functionality is the same. In fact, when designing such compilers care needs to be taken to limit introduction of errors, bugs or the like when updating one compiler to reflect changes in another. By decoupling compiler components 120 from a particular compiler, the same component can be utilized at both compile time and runtime thus eliminating duplicative work and error introduction. Further yet, current functionality, algorithms, core processes or the like can be reused. By way of example, a compiler component 120 or subcomponent can be added with an interface 130 to a language runtime or runtime library to enable the same functionality provided at compile time to be provided at runtime.

Figure 2:
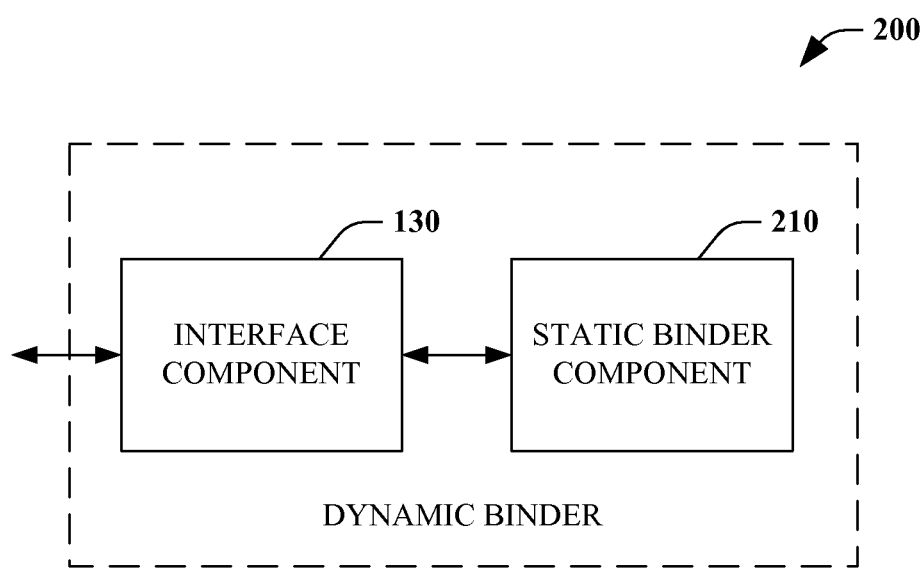
FIG. 2 is a block diagram of a dynamic binder in accordance with a disclosed aspect.

Turning attention to FIG. 2, a dynamic binder 200 (also a component as described herein) is illustrated in accordance with an aspect of the claimed subject matter. The dynamic binder 200 is able to bind types to programmatic constructs such as objects and/or objects to implementations at runtime. Included within the dynamic binder are various technologies known to be useful in binding including, without limitation, overload resolution and type inference. The dynamic binder 200 comprises a static binder component 210 and interface 130. The static binder component 210 is one embodiment of the compiler component 120 of FIG. 1. The interface component 130 facilitates interaction with the functionality supplied by the static binder component 210. More specifically, the interface component 130 enables the static binder component 210, designed to operate at compile time, to operate at runtime. Accordingly, the dynamic binder 200 is implemented in terms of the static binder component 210 utilizing the interface component 130.

Figure 3:
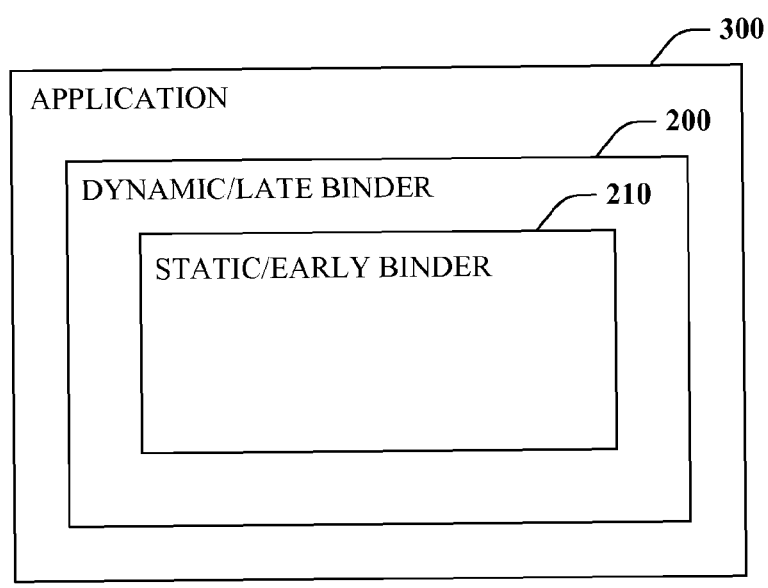
FIG. 3 is a block diagram illustrating relations between an application, dynamic binder, and static binder in accordance with an aspect of the disclosure.

Referring briefly to FIG. 3, a diagram is provided to illustrate how such a dynamic or late binder 200 fits into an application. As shown, an application 300 can host or otherwise employ dynamic binder 200. That application 300 can be any program designated for execution by one or more computers and/or processor-based devices. In one embodiment, the application 300 can be specified in a language that supports both early and late binding. The dynamic binder 200 then hosts or otherwise employs the static binder 210 to enable runtime binding. It is to be further noted that the static binder 20 need not only form part of the dynamic binder 200 but also can be employed to bind types where possible and/or desired at compile time.

To facilitate clarity and understanding with respect to aspects of the claimed subject matter, consider the following exemplary code snippet:

```
Dim str As String = "fff"
Dim o As Object
Dim b As Boolean = o.foo(str)
```

The code says that a variable "str" of type "String" is assigned the value "fff". Subsequently, a variable "o" of type "Object is declared and a method "foo" is called on the object including "str" as an argument. The result of the method invocation is then assigned to a variable "b" of type "Boolean". Here, a binder does not know how to resolve the method "foo" at compile time since type "Object" is at the root of the type hierarchy and hence the dynamic type of variable "o" might be more specific. Accordingly, binding is deferred until runtime at which time the dynamic type of variable "o" is known. At runtime, the same functionality can again be executed or resumed to determine how to resolve "foo".

Figure 4:
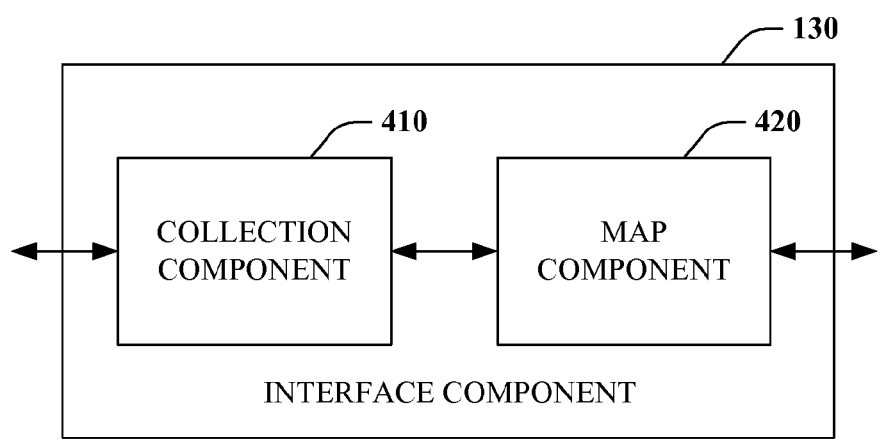
FIG. 4 is a block diagram of a representative interface component in accordance with a disclosed aspect.

Turning attention to FIG. 4, a representative interface component 120 is depicted in accordance with an aspect of the claimed subject matter. Collection component 410 can receive, retrieve, or otherwise acquire or collect data, metadata, information or the like. Map component 420 is communicatively coupled to the collection component 410 and operable to map, translate, or otherwise transform data, metadata, or the like to and from different formats. In fact, the map component 420 can interact with the collection component 410 to acquire requisite information for performing such a mapping between contexts.

In one instance, different contexts can refer to compile time and runtime. Here, the map component 420 can transform between compile time and runtime concepts including but not limited to symbol, line information, and/or error propagation. By way of example and not limitation, if something goes wrong at compile time an error list can be produced and at runtime an exception is thrown. Hence, an error list may need to be mapped to one or more exceptions and vice versa. In a situation as described above in which a dynamic binder is implemented in terms of a static binder, the map component 420 can acquire information from the collection component 410 and map from a runtime representation to a compile time representation and then back from the compile time representation to the runtime representation.

In the previous code snippet example, methods with the name "foo" will be discovered and passed utilizing collection component 410 in a runtime representation such as an array of "System.Reflection.MethodInfos.aruguments". Subsequently, the map component 420 can map method information and argument types into static binder types that are then processed by the static binder component 210 (FIG. 2). The result of the binding can then be mapped to the corresponding runtime concept such as "System.Reflection.MethodInfo".

Figure 5:
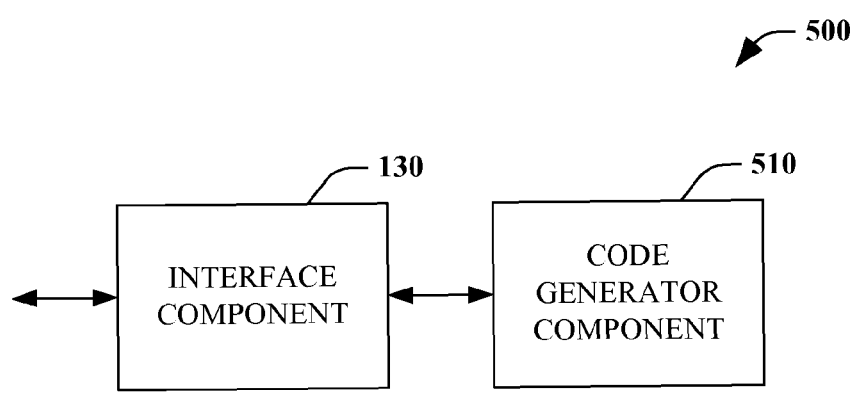
FIG. 5 is a block diagram of a code generation system utilizing componentized code generation functionality according to an aspect of the disclosure.

It is to be noted that any conventional compiler phase, pass, or process can be componentized in accordance with an aspect of the disclosure. Turning to FIG. 5, a code generation system 500 is illustrated according to an aspect. As depicted, the system 500 includes a code generator component 510, which is an embodiment of the compiler component 120 of FIG. 1. Additionally, interface component 130 is communicatively coupled to the code generator component 510 to facilitate interaction with the code generation component 510. By way of example, the code generation system 500 can be utilized to delay code generation to the last or later period of time, such as runtime. At runtime more information is available than at compile time. This information can be utilized to generate optimized and/or more efficient code. Additionally or alternatively, the code generation system 500 can be employed in conjunction with the previously described binder system, wherein the runtime code is generated and injected to facilitate binding.

The above description and embodiments pertain to employing static components at runtime. Static functionality or data/information generated thereby is pushed from compile time to runtime. However, the scope of the subject claims is not limited thereto. The reverse is also possible. In other words, runtime functionality or data/information generated thereby can be pushed to compile time. This can be useful for debugging among other things.

Figure 6:
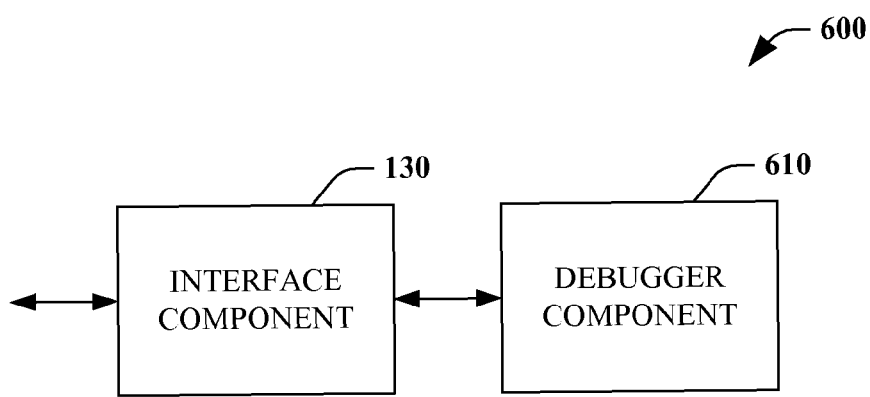
FIG. 6 is a block diagram of a debugger system that employs componentized debugging functionality in accordance with a disclosed aspect.

Referring to FIG. 6, a debugging system 600 is depicted in accordance with an aspect of the claimed subject matter. The system 600 includes debugger component 610 and interface component 130. The debugger component 610 can be an embodiment of a compiler component 120 as provided in FIG. 1 but is not limited thereto. Similar to conventional debuggers, the debugger component 610 can provide functionality associated with analyzing program execution to aid detection of programmatic errors, bugs, or the like. The interface component 130 enables interaction with the debugger component 610 thereby facilitating independent deployment of the debugger component. Among other things, the debugger component 610 can feedback information to a compile time component such as an integrated development environment (IDE) or a subcomponent of the IDE such as but not limited to an editor or compiler. In this manner, arbitrary code can be executed and debug information returned to a developer. For example, a language integrated query expression can be evaluated and debug information pushed back to an IDE to identify potential problems by way of colors, squiggly lines, or other means.

As another example, it is often times difficult to reason about the actual values of variables of type string. Consider the following exemplary code snippet and comments:

```
REM Value of X is not know at compile time
Dim X As String = Console.ReadLine( )
REM Evaluating string X as runtime might be security violation
Eval(X)
```

At runtime, such strings may be treated as a particular type of data or even code. This runtime-determined information can be provided back at compile time to ensure program correctness and/or a lack of unintended issues. By way of example, cross-site scripting is a security vulnerability in which data strings are interpreted as code at runtime. If code is monitored at runtime information can be provided back at compile time to notify a developer of a potential security hole.

Debugging is only one instance of pushing runtime functionality to compile time. Many other embodiments are possible and are to be considered within the scope of the appended claims. For example, developers often utilize static flow analysis to analyze a program and predict runtime behavior, but it is always an approximation. By pushing back runtime information such analysis is much more useful. For instance, it could be determined how many times a particular code paths are taken and provide such information back to an IDE component.

It should further be appreciated that that by componentizing compile time and/or runtime functionality such functionality is composable. In other words, components need not be employed alone. Rather, various combinations and/or permutations of components can be utilized together to produce unique functionality. Further yet, functionality, data, information or the like can be pushed from compile time to runtime, from runtime to compile time or both.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the interface component 130 can employ such mechanisms to facilitate mapping from a first context to a second context.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
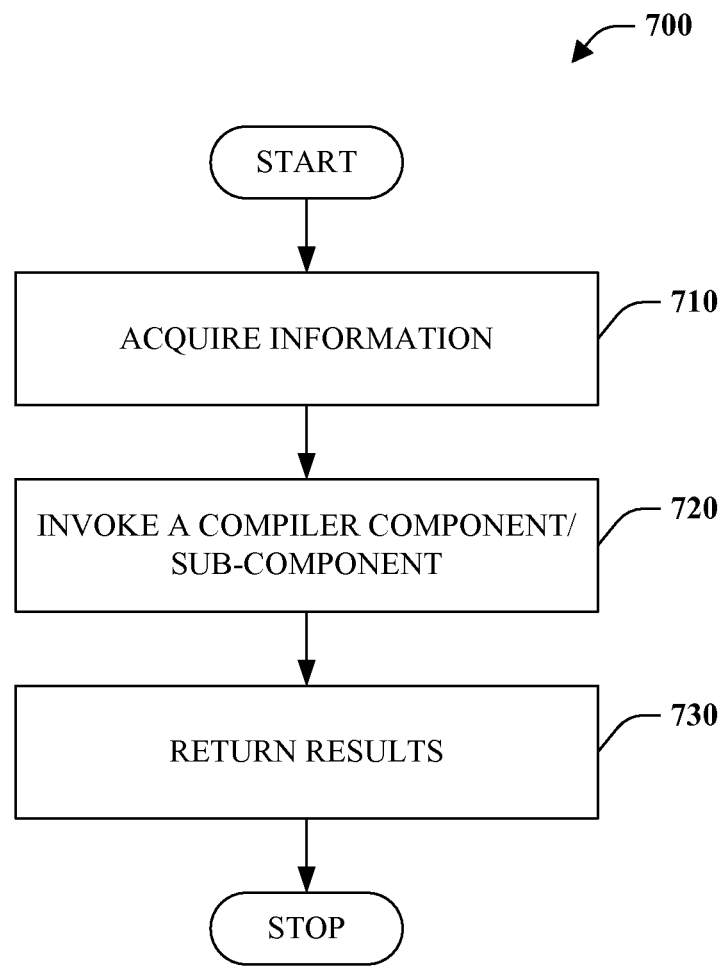
FIG. 7 is a flow chart diagram of a compilation method in accordance with an aspect of the disclosure.

Referring to FIG. 7, a compilation method 700 is illustrated in accordance with an aspect of the claimed subject matter. At reference numeral 710, data, metadata, and/or information is acquired, gathered, or otherwise collected. Collected data and the like can be packaged in particular ways to facilitate consumption or interaction. At numeral 720, a compiler component or subcomponent is invoked and passed the collected information. For example, a static binder, type checker, or debugger, among others, can be invoked. In one instance, such a compiler component can be associated with a compile time compiler and/or a runtime compiler. At reference numeral 730, results provided by the compiler component are returned.

Figure 8:
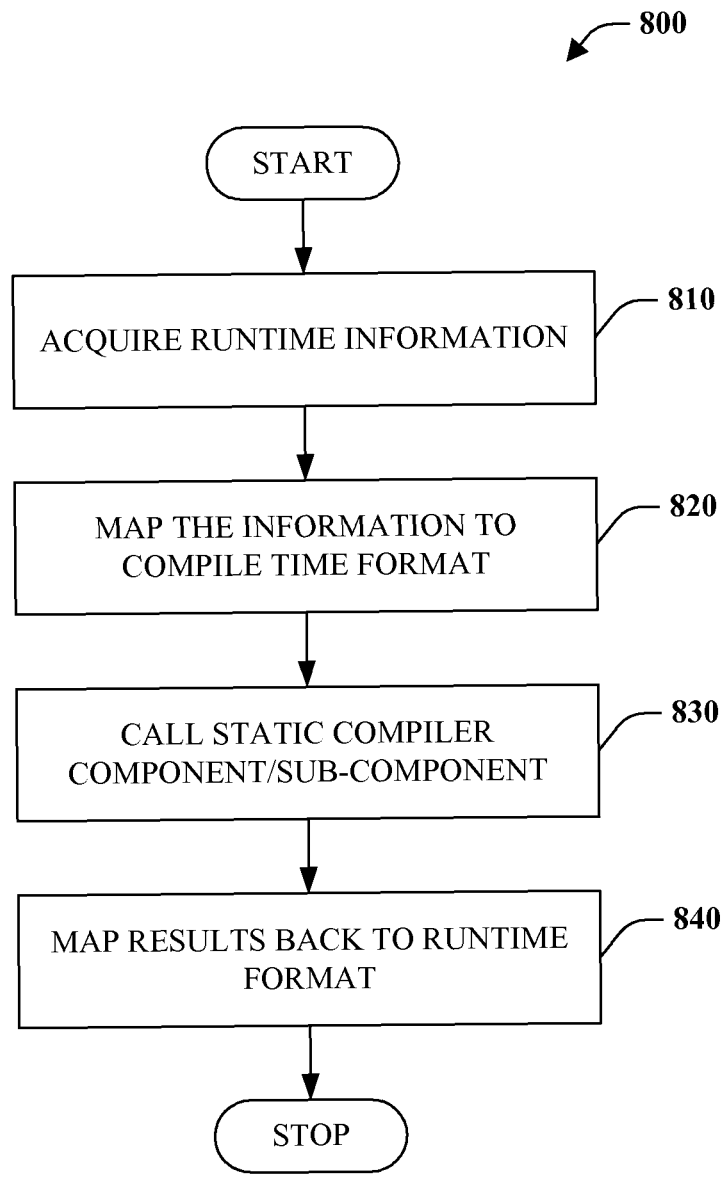
FIG. 8 is a flow chart diagram of method of implementing dynamic functionality in terms of static functionality according to a disclosed aspect.

FIG. 8 depicts a method 800 of implementing dynamic functionality in terms of static functionality according to a disclosed aspect. At reference numeral 810, runtime information is acquired. Such information can include code, state, and/or type, among other things. Acquired runtime information is mapped to compile time format at numeral 820. For instance, runtime exceptions can be mapped to compile time error production. At reference 830, a static compiler component or subcomponent is called or otherwise invoked. A compiler component 840 can refer to a parser, type binder, code generator, code optimizer or other phases or passes that comprise a compiler. Results are accepted from the compiler component or subcomponent and mapped from static compiler form to dynamic runtime form. Continuing with the previous example, static errors can be mapped or transformed into runtime exceptions.

Figure 9:
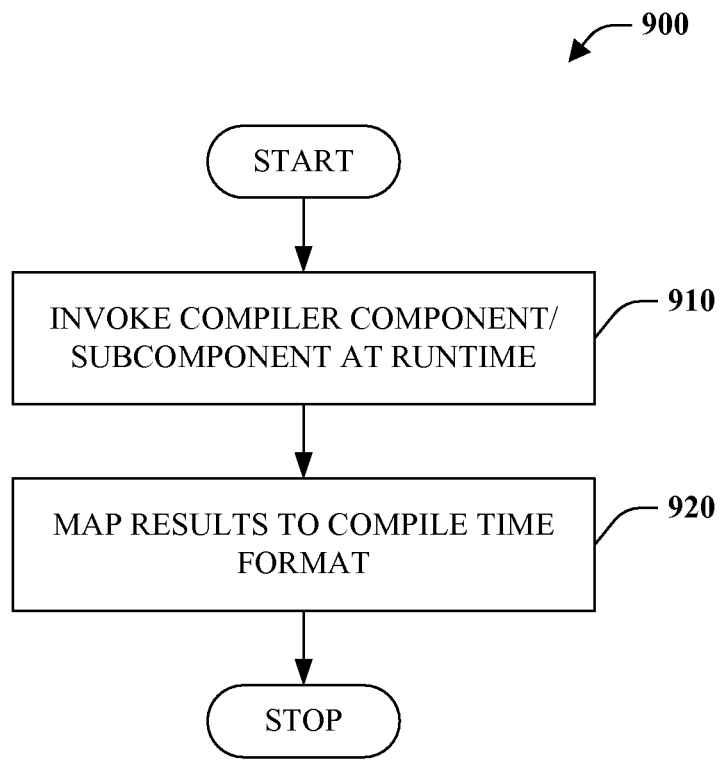
FIG. 9 is a flow chart diagram of a method of employing dynamic functionality statically at compile time in accordance with a disclosed aspect.

Referring to FIG. 9, a method 900 is shown depicting employment of dynamic functionality statically at compile time in accordance an aspect of the claimed subject matter. At reference numeral 910, a compiler component, subcomponent, or the like is invoked at runtime. Such a component can form part of a program language runtime or runtime library in one instance. Furthermore, the compiler component need not comprise a runtime conventionally although it may. At numeral 920, the results afforded by the runtime component can be mapped to compile time concepts and/or formats. In this manner, runtime information can cross into compile time to facilitate compilation and/or program development, among others. In essence, the line between compile time and runtime is blurred to support information flow from runtime to compile time rather than or in addition to the reverse.

By way of example, consider a compiler that functions in conjunction with an integrated development environment (IDE) to provide compile time feedback to aid program development. It is often difficult to reason about the correctness of strings at compile time, because they can be treated or interpreted differently at runtime. For instance, a string may be interpreted as a database query or code, among other things. By pushing back information about the actual, type, usage, or the like to compile time, more assistance can be provided to developers.

Many other compile time functions can benefit from runtime information including but not limited to flow analysis and/or profiling. For example, rather than speculating on program flow at compile time, the program can actually be executed and information feed back at compile time. Accordingly, it is possible to determine that a code branch of a conditional is taken ten times more than another branch, for instance.

Figure 10:
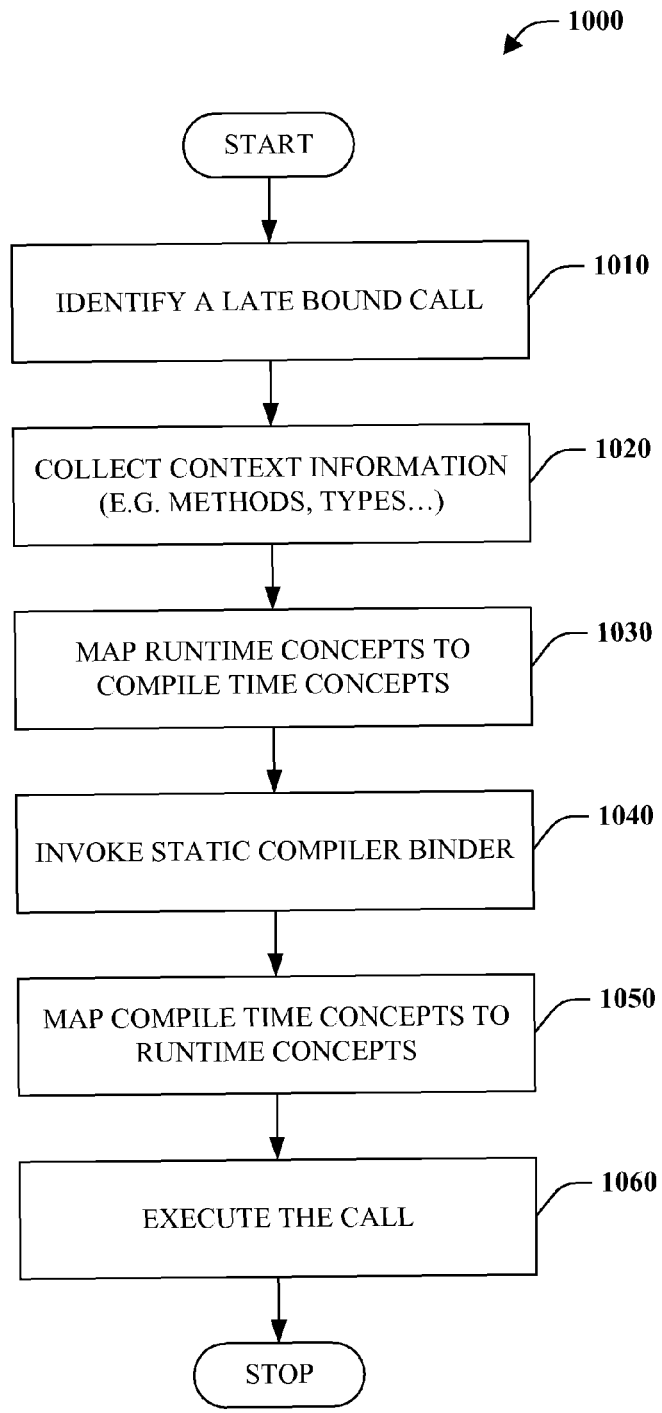
FIG. 10 is a flow chart diagram of a binding method in accordance with an aspect of the disclosure.

FIG. 10 is a flow chart diagram depicting a binding method 1000 in accordance with an aspect of the claimed subject matter. At reference numeral 1010, a late bound call is identified. A late-bound call is a method call that is determined at runtime rather than at compile time. This involves the process of figuring out which of a several methods to invoke dynamically. By way of example, an object dog may have several bark methods for different types of dogs, and the identity of the dog is only known at runtime based on user input, for instance. Accordingly, the correct bark method can only be known and available for invocation at runtime.

At numeral 1020, context information is collected that is necessary for binding. Such information can include but is not limited to types, input in scope, extension method lookup, and/or other options (e.g., compare is case sensitive/in-sensitive). Moreover, all methods that match the identified call are identified and collected as well as their respective argument types. In one embodiment, all the collected contextual information can be packaged into a particular format.

Runtime concepts are mapped to compile time concepts at reference numeral 1030. Such concepts or representations can differ substantially and as such, they are not conventionally transformed but rather left to occupy their respective worlds. However, mapping can be employed to bridge differences and accurately transform runtime concepts into compile time concepts. Again, this transformed data can be packaged in a particular form to facilitate transmission and/or subsequent processing, among other things.

At reference numeral 1040, a static compiler binder is invoked on with the compile time information. The static compiler binder includes the same functionality that is employed to bind method calls at compile time including such things as overload resolution and type inference, inter alia, to allow identification of a correct method call. Here, however, that static binding functionality is employed at runtime. For example, the binder can form part of a language runtime and/or associated library. Among other things, this enables component reuse as well as correctness guarantees that are otherwise not present in systems that utilize different compile time and runtime components, for example.

Upon return or acquisition of results from the compiler binder, compile time concepts are mapped back to runtime concepts at 1050. For example, compile time errors can be transformed into runtime exceptions. In this manner, data representation is shifted back to the runtime context. The identified call can then be executed at reference numeral 1060.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the new events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
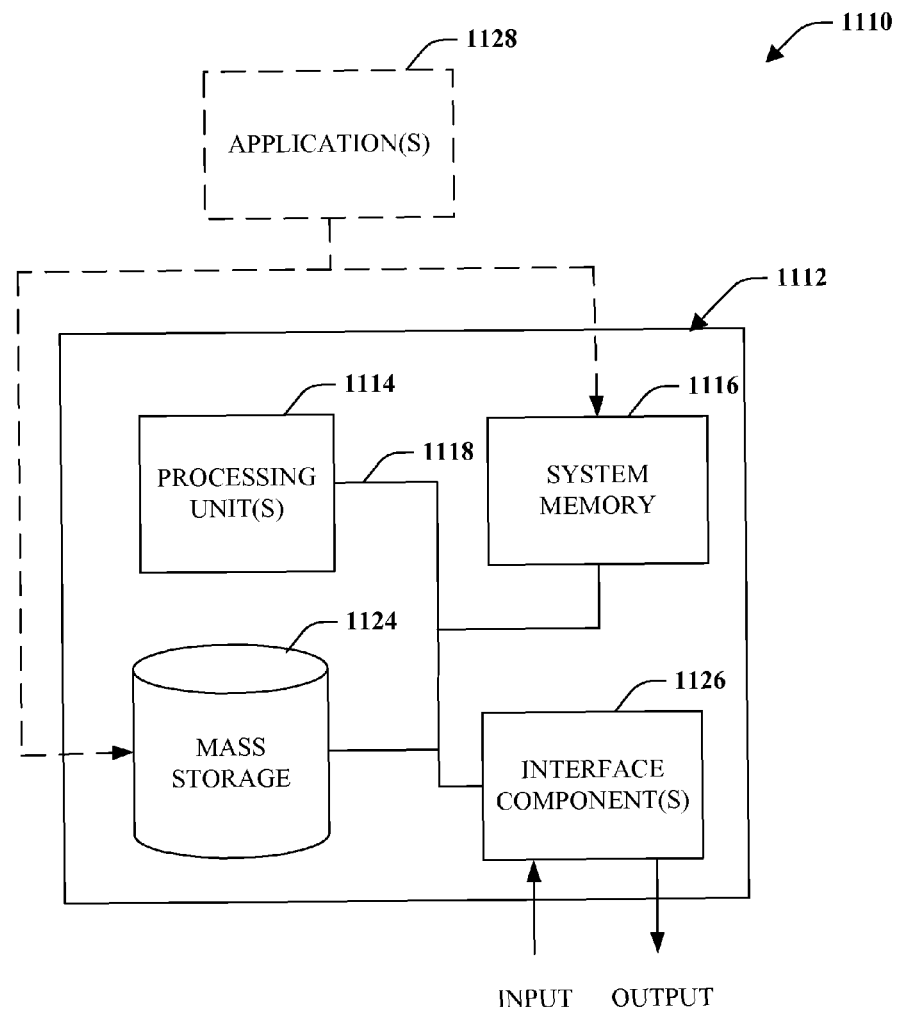
FIG. 11 is a schematic block diagram illustrating a suitable operating environment for aspects of the subject disclosure.
Figure 12:
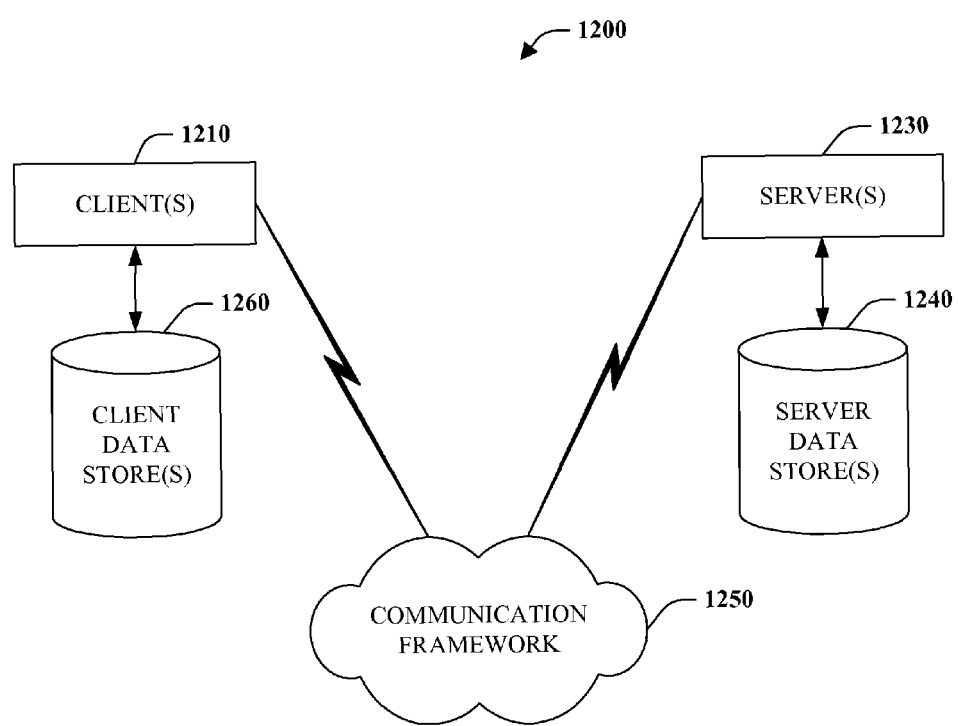
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory, or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

Client/server interactions can be utilized with respect with respect to various aspects of the claimed subject matter. By way of example and not limitation compiler components, subcomponents or the like can be embodied as compile-time and/or runtime services. Rather than requiring a native machine compiler components programs can be compiled statically utilizing a services provided by one or more servers 1230 that provide compilation functionality or the like and send results back to requesting clients 1210. Similarly, the same functionality can be available at runtime. Furthermore, services can be provided by servers 1230 to clients 1210 across communication framework 1250 that map or transform runtime concepts to compiler concepts and/or vice versa.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A code compilation system which separates separate compiler phases into separate compiler components, the system comprising computer instructions executing upon one or more computer processors, the system further comprising:
   a compiler component that performs a subset of compilation functionality associated with a compiler phase;
   a map component which maps, translates and transforms data to runtime format from compile time format and maps, translates and transforms data to compile time format from runtime format; and
   an interface component communicatively coupled with the compiler component that facilitates independent interaction with the compiler component, the interface component enabling interaction with the compiler component at both runtime and at compile time, wherein the compiler component performs the steps of:
   identifying code for compilation;
   at the compile time, deferring application of at least one phase of compilation until runtime;
   identifying at least one late bound call within the code;
   invoke the map component, through the interface component, to transform data associated with the late bound call to the runtime format from the compile time format to facilitate runtime binding using a static binder component that is communicatively coupled to the interface component;
   invoking the static binder component using the identified at least one late bound call at the compile time such that static binding functionality may be invoked at the runtime; and
   invoking a compile time mechanism through the interface component, at the runtime to complete the deferred phase processing for the phase of compilation which was deferred at the compile time.

2. The system of claim 1, the compiler component is a static component that is employed at the runtime.

3. The system of claim 1, the compiler component is a dynamic component that is employed at the compile time.

4. The system of claim 1, the compiler components is employable at the runtime and the compile time.

5. The system of claim 4, further comprising a component that maps between runtime and compile time concepts.

6. The system of claim 5, further comprising a collection component that collects information to preserve semantics across time.

7. The system of claim 1, the compiler component is a static binder.

8. The system of claim 7, the static binder and interface component form a dynamic binder.

9. The system of claim 1, the compiler component is a code generator component employed at the runtime.

10. The system of claim 1, the compiler component is a debugger component that feeds back runtime information at the compile time.

11. The system of claim 1, the interface component enables utilization of the compilation functionality across different contexts.

12. A method for compiling program code comprising:
   identifying code for compilation;
   at compile time, deferring application of at least one phase of compilation until runtime;
   identifying at least one late bound call within the code;
   a map component transforming data associated with the at least one late bound call to runtime format from compile time format to facilitate runtime binding using a static binder component;
   invoking a static compiler binder using the identified at least one late bound call at the compile time such that static binding functionality may be invoked at the runtime; and
   invoking a compile time mechanism at the runtime to complete phase processing for the at least one phase of compilation which was deferred at the compile time wherein an interface component enables the static binder component to perform the deferred phase processing at the runtime.

13. The method of claim 12, further comprising mapping runtime concepts to compile time concepts.

14. The method of claim 12, collecting contextual information at the runtime for processing by the compile time mechanism.

15. The method of claim 12, further comprising hosting the compile time mechanism in a runtime library.

16. The method of claim 12, the phase processing comprising binding programmatic constructs to implementations.

17. The method of claim 12, the phase processing comprising generating code.

18. The method of claim 17, further comprising generating language specific code to optimize performance.

* * * * *